United States Patent
Lease

(10) Patent No.: US 6,743,386 B2
(45) Date of Patent: Jun. 1, 2004

(54) METHOD FOR PROCESSING CHOPPED FIBERGLASS BUNDLES

(75) Inventor: Daniel T. Lease, Spring Grove, IL (US)

(73) Assignee: General Kinematics Corporation, Barrington, IL (US)

( * ) Notice: Subject to any disclaimer, the term of this patent is extended or adjusted under 35 U.S.C. 154(b) by 94 days.

(21) Appl. No.: 10/135,480

(22) Filed: Apr. 30, 2002

(65) Prior Publication Data
US 2003/0201562 A1 Oct. 30, 2003

(51) Int. Cl.[7] ............................................... B29C 67/02
(52) U.S. Cl. .......................... 264/69; 264/71; 264/117
(58) Field of Search ............................ 264/69, 71, 117, 264/119

(56) References Cited

U.S. PATENT DOCUMENTS

| | | |
|---|---|---|
| 4,207,005 A | 6/1980 | Stanfield |
| 4,709,507 A | 12/1987 | Musschoot |
| 4,726,095 A | 2/1988 | Bissell, Jr. et al. |
| 4,926,601 A | 5/1990 | Musschoot |
| RE33,542 E | 2/1991 | Musschoot |
| 5,512,008 A | 4/1996 | Musschoot |
| 5,536,203 A | 7/1996 | Takeyoshi et al. |
| 5,591,074 A | 1/1997 | Musschoot |
| RE35,984 E | 12/1998 | Fadell et al. |
| 5,935,289 A | 8/1999 | Arterburn et al. |
| 5,970,837 A | 10/1999 | Arterburn et al. |
| 6,062,048 A | 5/2000 | Arterburn et al. |
| 6,076,442 A | 6/2000 | Arterburn et al. |
| 6,148,640 A | 11/2000 | Hendrickson et al. |
| 6,148,641 A | 11/2000 | Blough et al. |
| 6,267,035 B1 | 7/2001 | Bascom et al. |

FOREIGN PATENT DOCUMENTS

| | | |
|---|---|---|
| EP | 0 386 872 A1 | 9/1990 |

OTHER PUBLICATIONS

International Search Report for International Patent Application No. PCT/US03/13651, dated Sep. 3, 2003, 7 pages.

Primary Examiner—Stephen J. Lechert, Jr.
(74) Attorney, Agent, or Firm—Marshall, Gerstein & Borun LLP

(57) ABSTRACT

A vibratory apparatus and method for agglomerating chopped bundles of wet fiberglass strands into uniform segments includes a container having a curved inner surface disposed about a generally horizontal axis where the container is mounted on a plurality of springs. The chopped bundles of wet fiberglass strands to be agglomerated are placed onto the curved inner surface at an input end of the container. A vibratory force is produced to cause the chopped bundles of wet fiberglass strands to be moved from the input end toward an output end of the container. The vibratory force causes the chopped bundles of wet fiberglass strands to be directed in a rising and falling path of rolling movement within the container. As a result of the rolling movement of the chopped bundles within the container which is produced by the vibratory force, the chopped bundles of wet fiberglass strands are converted into uniform segments by reason of agglomeration of the wet fiberglass strands.

6 Claims, 4 Drawing Sheets

METHOD FOR PROCESSING CHOPPED FIBERGLASS BUNDLES

FIELD OF THE INVENTION

The present invention is generally directed to apparatus and methods for processing materials and, more particularly, apparatus and methods for agglomerating chopped bundles of wet fiberglass strands into uniform segments.

BACKGROUND OF THE INVENTION

In the manufacture of articles molded of plastic materials, it is known that fiberglass can be used to reinforce them so they have the requisite strength for their intended application. The mechanical strength of a fiberglass reinforced plastic article is dependent upon the quantity of fiberglass utilized as well as the characteristics of the glass fibers themselves. By controlling the quantity of fiberglass and the characteristics of the glass fibers, the strength attained can be balanced with the appearance of the plastic article.

In order to facilitate the manufacture of articles molded of plastic materials that are strengthened through reinforcement with fiberglass, techniques have been developed that involve the formation of bundles of fiberglass strands. These techniques typically involve forming a number of strands from a plurality of glass fibers that make up each strand, merging the strands and passing them through a set of pull rolls, and then chopping the strands into a plurality of discrete bundles. Essentially, the fiberglass strands, which may each be made up of several thousand glass fibers, are funneled together and then chopped to length, e.g., ⅛ inch, ¼ inch, ½ inch, etc.

As the bundles of fiberglass strands are being formed, they are "wet", i.e., the glass fibers have a liquid coating that comprises on the order of approximately 7% to 19% moisture by weight. This "wet" material, when chopped, produces non-uniform, "fuzzy" bundles which is the result of the cutter tending to flatten the funneled strands from a cylindrical shape to an elliptical form which causes the fibers to be out of alignment with one another at the cut ends. With "fuzzy" ends, the chopped bundles of fiberglass strands do not flow evenly through conventional metering devices that are typically used to deliver them in quantity during plastic molding processes.

Because of the uneven flow of the chopped bundles through the metering devices, there is a limitation on the plastic molding process that reduces efficiency and increases cost.

For the foregoing reasons, there has been a need for apparatus and methods for agglomerating chopped bundles of wet fiberglass strands from fuzzy bundles into uniform segments so that they will flow evenly through metering devices at a greater rate of speed to increase efficiency and decrease cost by accommodating a higher rate of production during plastic molding processes.

SUMMARY OF THE DISCLOSURE

In accordance with one aspect of the disclosure, a vibratory apparatus for agglomerating chopped bundles of wet fiberglass strands into uniform segments is provided that includes a container and a vibration generator. The container has a curved inner surface disposed about a generally horizontally extending longitudinal axis with a chopped bundle input end and an axially-spaced uniform segments output end opposite the input end. The container is mounted on a plurality of springs so as to be resiliently supported above a base surface, and the vibration generator produces a vibratory force to cause the chopped bundles of fiberglass strands to be directed in a generally rising and falling path of rolling movement along the curved inner surface of the container. The rolling movement occurs while the chopped bundles are being transported in the direction of the generally horizontal longitudinal axis from the input end toward the output end of the container. With the foregoing arrangement, the rolling movement of the chopped bundles provided by the vibratory apparatus produces uniform segments by causing agglomeration of the wet fiberglass strands.

In accordance with another aspect of the disclosure, a method of agglomerating chopped bundles of wet fiberglass strands into uniform segments is provided which includes providing a container having a curved inner surface disposed about a generally horizontally extending longitudinal axis and mounting the container on a plurality of springs to resiliently support the container above a base surface. A plurality of chopped bundles of wet fiberglass strands to be agglomerated are placed onto the curved inner surface at an input end of the container, and a vibratory force is produced to cause the chopped bundles of wet fiberglass strands to be moved from the input end toward an output end of the container. Additionally, the vibratory force causes the chopped bundles of wet fiberglass strands to be directed in a rising and falling path of rolling movement within the container whereby the rolling movement of the chopped bundles produces uniform segments by causing agglomeration of the wet fiberglass strands.

Other advantages and features of the disclosure will become apparent from a consideration of the following description taken in conjunction with the accompanying drawings.

DETAILED DESCRIPTION OF THE PREFERRED EMBODIMENT

Figure 1:
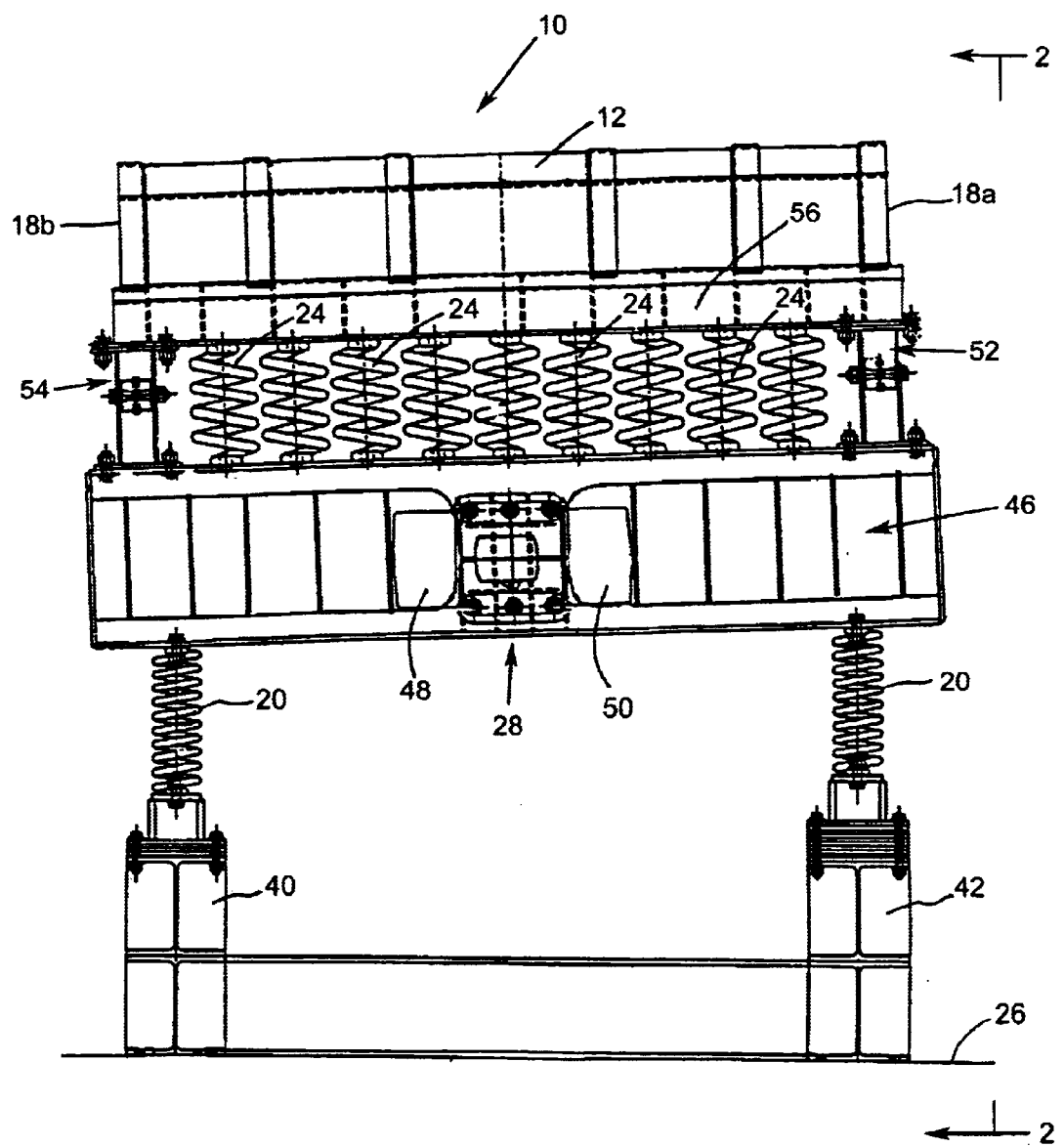
FIG. 1 is a front elevational view of a vibratory apparatus for agglomerating chopped bundles of wet fiberglass strands into uniform segments in accordance with the present invention.
Figure 2:
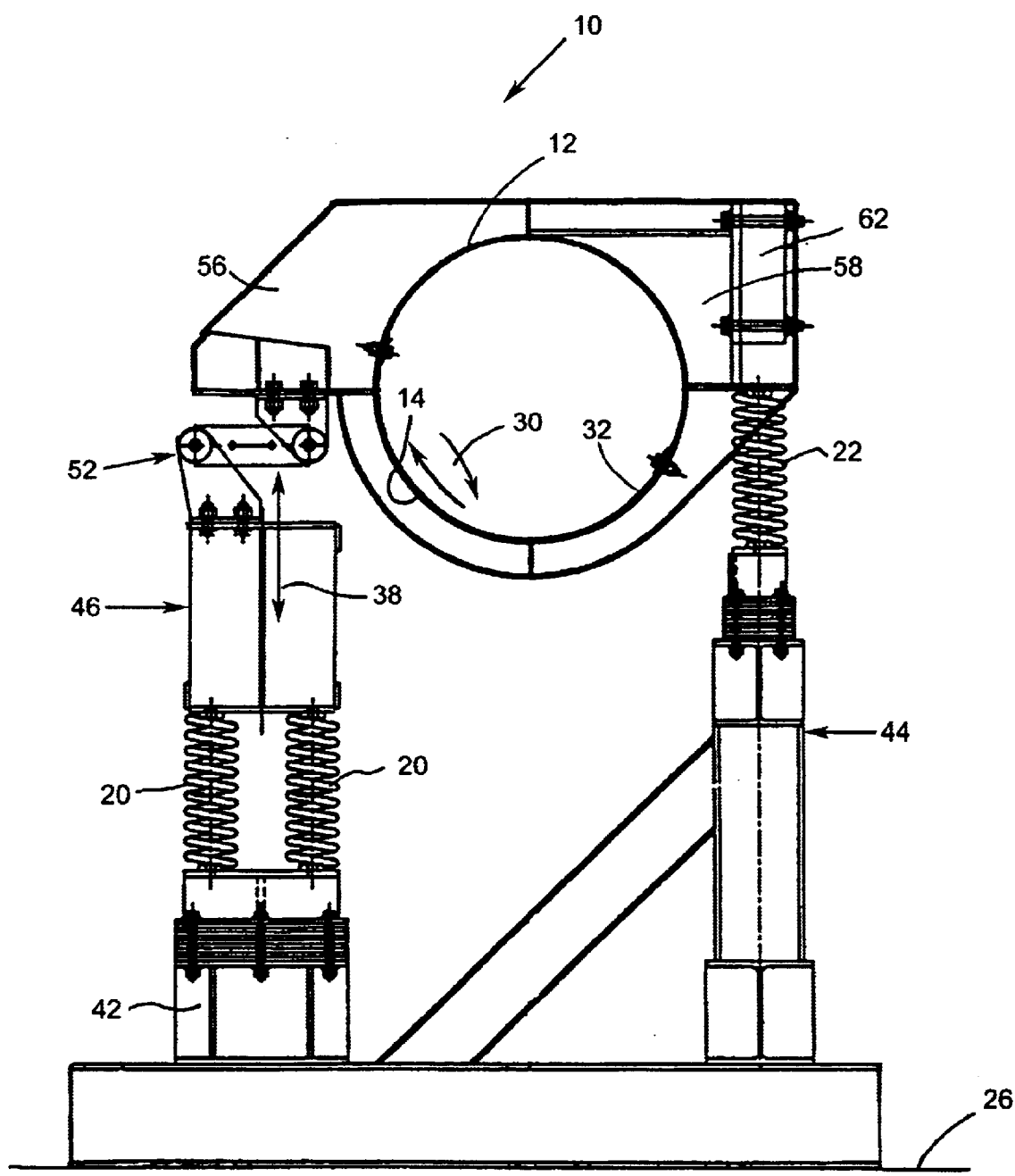
FIG. 2 is an end elevational view taken generally along the line 2—2 of FIG. 1.
Figure 3:
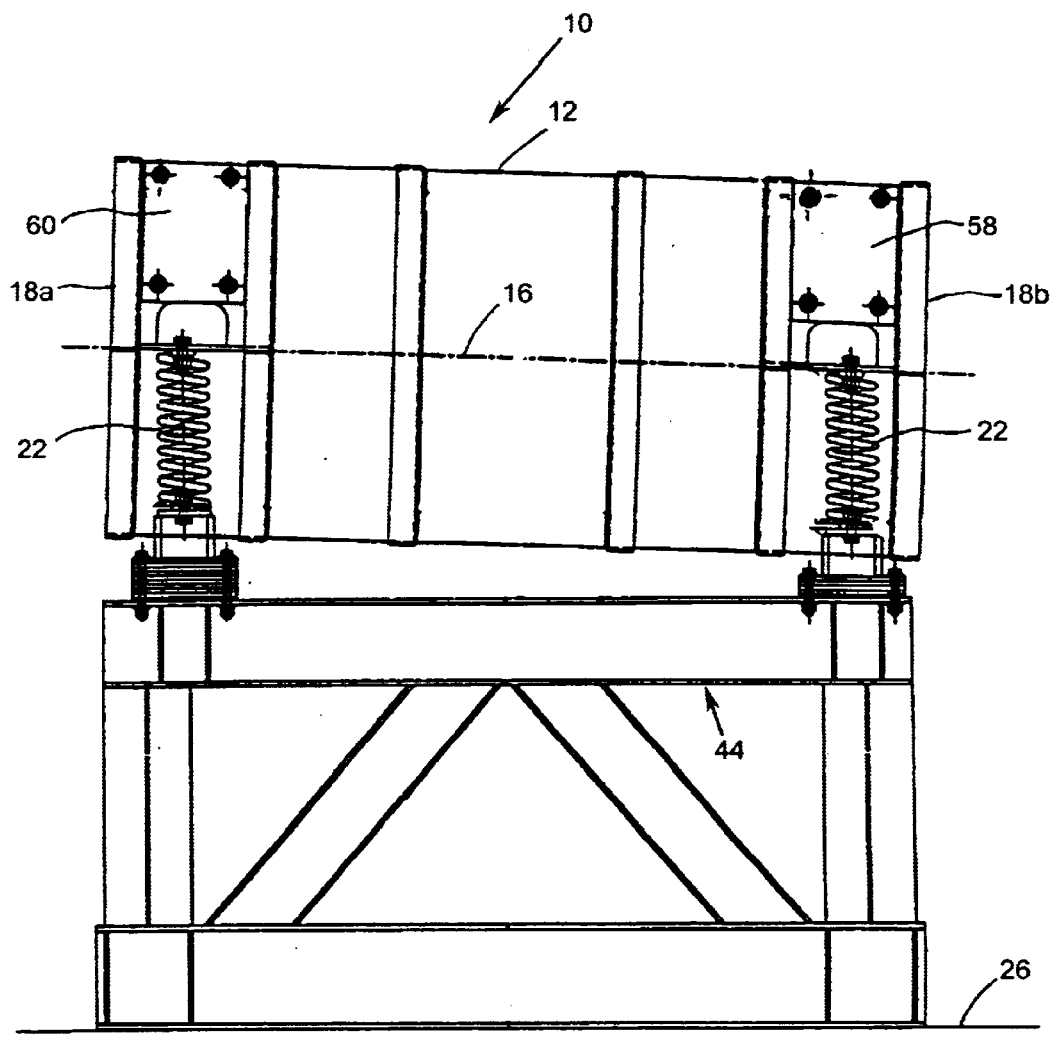
FIG. 3 is a rear elevational view of a vibratory apparatus for agglomerating chopped bundles of wet fiberglass strands into uniform segments in accordance with the present invention.

Referring to FIGS. 1–3, the reference numeral 10 designates generally a vibratory apparatus for agglomerating chopped bundles of wet fiberglass strands into uniform segments which includes a container 12 having a curved inner surface 14 disposed about a generally horizontally extending longitudinal axis 16. The container 12 has a chopped bundle input end 18a and an axially spaced uniform segment output end 18b opposite the input end 18a, and it is mounted on a plurality of springs generally designated 20, 22, and 24 so as to be resiliently supported above a base surface 26 therefor. The vibratory apparatus 10 also includes a vibration generator generally designated 28 for producing a vibratory force to cause the chopped bundles of wet fiberglass strands to move within the container 12. The chopped bundles of wet fiberglass strands are directed in a generally rising and falling path of rolling movement as generally represented by the double-ended arrow 30 along the curved inner surface 14 of the container 12. The rolling movement occurs as the chopped bundles of wet fiberglass strands are being transported in the direction of the generally horizontally extending longitudinal axis 16 from the input end 18a toward the output end 18b of the container 12. With this arrangement, the vibratory forces which are produced by the vibration generator 28 and transmitted to the container 12 produces the rolling movement which causes the chopped bundles of wet fiberglass strands to be formed into uniform segments by causing agglomeration or alignment of the wet fiberglass strands thereof.

Figure 4:
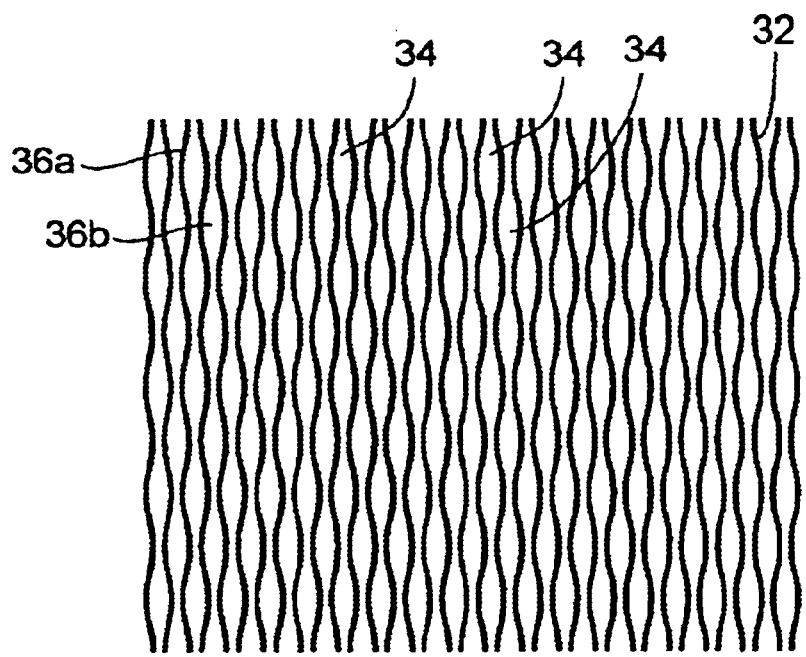
FIG. 4 is a plan view of a section of a dimpled liner for the vibratory apparatus of FIG. 1.

Referring to FIGS. 1 and 2, the container 12 is preferably in the form of a cylindrical drum and the curved inner surface 14 is preferably provided by a dimpled liner 32 within the cylindrical drum 12 upon which the chopped bundles of wet fiberglass strands undergo rolling movement (see, also, FIG. 4). The curved inner surface defined by the dimpled liner 32 within the cylindrical drum 12 includes a plurality of generally elongated dimples 34 projecting inwardly in relation to the cylindrical drum 12 so as to be generally staggered in adjacent rows such as 36a and 36b. As will be appreciated from FIG. 4, the generally elongated dimples 34 of the curved inner surface 14 defined by the dimpled liner 32 are generally elliptically shaped and are preferably elongated in the direction of the generally horizontally extending longitudinal axis 16 of the container 12.

Referring now to FIG. 2, the vibratory force produced by the vibration generator 28 is generally represented by the double-ended arrow which has been designated by reference number 38. It will be seen and appreciated that the vibratory force 38 is directed generally along a linear path which is displaced from the generally horizontally extending longitudinal axis 16 and also displaced from the center of gravity of the container. As will also be appreciated, the plurality of springs 20, 22, and 24 mounts the container 12 for unconstrained vibratory movement in response to the vibratory force 38 produced by the vibration generator 28.

As shown in FIG. 1, the cylindrical drum 12 is mounted such that the generally horizontally extending longitudinal axis 16 is actually inclined downwardly from the input end 18a to the output end 18b. It will be recalled that the vibratory force 38 produced by the vibration generator 28 causes the chopped bundles of wet fiberglass strands within the container 12 to be directed in a generally rising and falling path of rolling movement along the curved inner surface 14 on the dimpled liner 32 as discussed above. As this rolling movement occurs, the downward inclination of the container 12 causes the chopped bundles of wet fiberglass strands to be transported by gravity from the input end 18a toward the output end 18b.

Referring to FIGS. 1 and 2, the springs 20 isolate the container 12 from the base surface 26 on one side whereas the springs 22 isolate the container 12 from the base surface 26 on the other side. The springs 20 and 22 may be set apart from the base surface 26 by appropriate means such as steel columns 40, 42 and steel support structure 44, respectively. In this manner, it will be understood that the vibration generator 28 which produces the vibratory force 38 is entirely isolated from the base structure 26 upon which the vibratory apparatus 10 is mounted.

As shown in FIGS. 1 and 3, the vibration generator 28 may comprise a beam 46 that spans the springs 20 which, as illustrated in FIG. 2, may include a pair of springs 20 between each of the steel columns 40 and 42 and the beam 46. In addition, the vibration generator 28 may include a pair of eccentric weight motors 48 and 50 that, coupled with the springs 20 and 24, serves to produce the vibratory force 38 that causes the rolling movement of the chopped bundles of wet fiberglass strands.

By referring to FIGS. 1 and 2, it will be appreciated that the beam 46 is linked to the cylindrical drum 12 by means of rocker leg assemblies generally designated 52 and 54 generally near the input end 18a and the output end 18b, respectively. The springs 26 will be understood to span between the column 46 and an arm 56 extending outwardly of the cylindrical drum 12. In this manner, the cylindrical drum 12 has freedom of movement constrained only by the rocker leg assemblies 52 and 54 and the springs 26 in response to the vibratory force 38 produced by the vibration generator 28.

As will be appreciated from FIGS. 2 and 3, the cylindrical drum 12 may include a pair of outwardly extending arms generally designated 58 and 60. The arms 58 and 60 may each include an integrally associated ballast weight such as 62 (see FIG. 2) which is on the side of the vibratory apparatus 10 opposite the vibration generator 28. With this arrangement, the ballast weights such as 62, together with the mountings provided by the springs 20, 22 and 24, assist in producing the vibratory force 38.

Referring specifically to FIG. 3, the springs 22 will be seen to extend between the steel support structure 44 and the outwardly extending arms 58 and 60 and, thus, the springs 20 and 22 serve as isolation springs between the base surface 26 and the operating components of the vibratory apparatus 10. As for the springs 22, they isolate the cylindrical drum 12 from the vibration generator 28 which produces the vibratory force 38 that is offset from the center of gravity of the cylindrical drum 12 and the generally horizontally extending longitudinal axis 16.

Figure 5A:
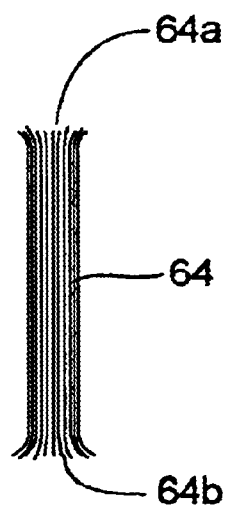
FIG. 5a is a perspective view of a chopped fuzzy bundle of wet fiberglass strands.
Figure 5B:
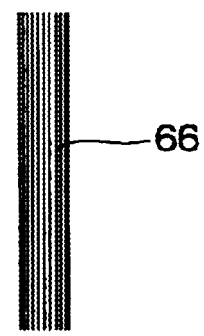
FIG. 5b is a perspective view of uniform segments of aligned fiberglass strands.

Referring to FIGS. 5a and 5b, the results of using the vibratory apparatus 10 will be understood and appreciated wherein FIG. 5a illustrates a chopped bundle 64 of wet fiberglass strands that have "fuzzy" ends as at 64a and 64b are the product of the chopping procedure. It will be understood and appreciated that a plurality of strands of glass fibers that have been coated, formed into strands, and funneled together are chopped into bundles of a desired length as previously discussed. With regard to the results of processing the chopped bundles such as 64 in the vibratory apparatus 10, FIG. 5b illustrates the uniform segments 66 produced as a result of the rolling movement of the chopped bundles which cause agglomeration and alignment of the wet fiberglass strands and fibers.

In another respect, a method of agglomerating chopped bundles of wet fiberglass strands into uniform segments includes providing a container 12 having a curved inner surface 14 disposed about a generally horizontally extending longitudinal axis 16. The container 12 is mounted on a plurality of springs 20, 22 and 24 to resiliently support the container 12 above a base surface 26 therefore. A plurality of chopped bundles of wet fiberglass strands to be agglomerated is placed onto the curved inner surface 14 at an input end 18a of the container 12. A vibratory force 38 is produced to cause the chopped bundles of wet fiberglass strands to move from the input end 18a to an output end 18b of the container 12. The vibratory force 38 causes the chopped bundles of wet fiberglass strands to be directed in a rising and falling path 30 of rolling movement. As a result of the rolling movement of the chopped bundles on the curved inner surface 14 of the container 12, uniform segments such as 66 are produced by causing agglomeration and alignment of the wet fiberglass strands and fibers.

In furtherance of the method, the container 12 may be in the form of a cylindrical drum and a dimpled liner 32 may be provided within the cylindrical drum 12 to define the curved inner surface 14 upon which the chopped bundles of fiberglass strands undergo rolling movement. Also, the curved inner surface 14 defined by the dimpled liner 32 within the cylindrical drum 12 may include a plurality of generally elongated dimples 34 projecting inwardly in relation to the cylindrical drum 12 so as to be staggered in adjacent rows such as 36a and 36b. Still additionally, the generally elongated dimples 34 of the curved inner surface 14 defined by the dimpled liner 32 may be generally elliptical and elongated in the direction of the generally horizontally extending longitudinal axis 16 of the container 12.

Further, the vibratory force 38 which is produced may be directed along a linear path displaced from the generally horizontally extending longitudinal axis 16 and also displaced from the center of gravity of the container 12. Additionally, the plurality of springs 20, 22 and 24 upon which the container 12 is mounted may resiliently support the container 12 above the base surface 26 for unconstrained vibratory movement in response to the vibratory force 38.

While in the foregoing there has been set forth a preferred embodiment of the disclosure, it will be appreciated that the details herein given may be varied by those skilled in the art without departing from the true spirit and scope of the appended claims.

What is claimed is:

1. A method of agglomerating chopped bundles of wet fiberglass strands into uniform segments, comprising:

providing a container having a curved inner surface disposed about a generally horizontally extending longitudinal axis, mounting the container on a plurality of springs to resiliently support the container above a base surface therefor;

placing a plurality of chopped bundles of wet fiberglass strands to be agglomerated onto the curved inner surface at an input end of the container, producing a vibratory force to cause the chopped bundles of wet fiberglass strands to move from the input end to an output end of the container;

the vibratory force causing the chopped bundles of wet fiberglass strands to be directed in a rising and falling path of rolling movement;

whereby the rolling movement of the chopped bundles produces uniform segments by causing agglomeration of the wet fiberglass strands.

2. The method of claim 1 wherein the container is in the form of a cylindrical drum and a dimpled liner is provided within the cylindrical drum to define the curved inner surface upon which the chopped bundles of fiberglass strands undergo rolling movement.

3. The method of claim 2 wherein the curved inner surface defined by the dimpled liner within the cylindrical drum includes a plurality of generally elongated dimples projecting inwardly in relation to the cylindrical drum so as to be staggered in adjacent rows.

4. The method of claim 3 wherein the generally elongated dimples of the curved inner surface defined by the dimpled liner are generally elliptical and are elongated in the direction of the generally horizontally extending longitudinal axis of the container.

5. The method of claim 1 wherein the vibratory force which is produced is directed along a linear path displaced from the generally horizontally extending longitudinal axis and also displaced from the center of gravity of the container.

6. The method of claim 1 wherein the plurality of springs upon which the container is mounted resiliently support the container above the base surface for unconstrained vibratory movement in response to the vibratory force which is produced.

\* \* \* \* \*

UNITED STATES PATENT AND TRADEMARK OFFICE
CERTIFICATE OF CORRECTION

PATENT NO. : 6,743,386 B2
DATED : June 1, 2004
INVENTOR(S) : Daniel T. Lease

It is certified that error appears in the above-identified patent and that said Letters Patent is hereby corrected as shown below:

<u>Column 6,</u>
Line 6, please delete "container," and insert -- container; --.

Signed and Sealed this

Twenty-third Day of November, 2004

JON W. DUDAS
*Director of the United States Patent and Trademark Office*